United States Patent [19]

Wagener

[11] Patent Number: 4,832,626
[45] Date of Patent: May 23, 1989

[54] ADAPTER

[75] Inventor: Hans Wagener, Dietzholztal, Fed. Rep. of Germany

[73] Assignee: Rittal-Werk Rudolf Loh GmbH & Co.KG, Herborn, Fed. Rep. of Germany

[21] Appl. No.: 131,783

[22] Filed: Dec. 11, 1987

[30] Foreign Application Priority Data

Dec. 12, 1986 [DE] Fed. Rep. of Germany ....... 3642518

[51] Int. Cl.⁴ .............................................. H01R 9/00
[52] U.S. Cl. .................................... 439/715; 439/775
[58] Field of Search ............... 439/775, 776, 715, 721, 439/110

[56] References Cited

U.S. PATENT DOCUMENTS

| | | | |
|---|---|---|---|
| 2,997,628 | 8/1961 | John | 439/715 |
| 4,002,398 | 1/1977 | Hanisch et al. | 439/715 |
| 4,169,652 | 10/1979 | Höckele et al. | 439/776 |
| 4,214,805 | 7/1980 | Faulconer | 439/715 X |
| 4,659,169 | 4/1987 | Ustin et al. | 439/715 |

Primary Examiner—William L. Sikes
Assistant Examiner—Frank González

[57] ABSTRACT

An improved space-saving, clearly arranged, and safe adapter apparatus for mechanical and electrical connection of installation devices such as automatic circuit breakers, motor protection switches, contactors, relays, and the like with bus rails of a bus bar system. The apparatus has an adapter housing which can be placed on the bus rails, contact bars in the housing, and adjustable clamps for mechanically and electrically connecting the contact bars to the bus rails. The contact bars extend to portions forming contacts for receptors, including threaded rings on the front of the adapter housing, for fuses held by screw caps. The adapter housing also has on its front a mounting bracket for mounting of installation devices.

14 Claims, 2 Drawing Sheets

ADAPTER

FIELD OF THE INVENTION

This invention is related to adapter apparatus for electrical and mechanical connection of installation devices such as automatic circuit breakers, motor protection switches, contactors, switch protectors, relays and the like to bus bar systems, particularly installation devices having a mounting foot for standardized mounting brackets.

BACKGROUND OF THE INVENTION

Installation devices of the type just mentioned can be fastened quickly and simply to electrical adapter apparatus by means of standardized mounting brackets. In switching boards and similar set-ups of the prior art, the mounting brackets are arranged separately from the bus rails which may be present. The installation devices are connected to each other or to the bus rails by means of connector leads for which separate connector clamps are used for electrical and mechanical connection of bus rails and installation devices.

This type of connection requires not only different parts but corresponding room, particularly when the installation devices fixed to mounting brackets must also be connected to the bus rails through fuses providing the required short-circuit protection. In addition, leading the connections from the bus rails to the fuses and the installation devices involves the danger of misconnections and mix-ups.

OBJECT OF THIS INVENTION

It is the object of this invention to provide an improved adapter apparatus, of the type mentioned above, allowing installation devices to be connected with the bus rails of a bus bar system in the same simple way as before, but which is a space-saving and more clearly-organized structure which accommodates short-circuit protection.

This invention achieves this objective in the following manner. An adapter housing which may be set over the bus rails has contact bars therein held with adjustable clamps against the bus rails, the contact bars being mechanically and electrically connected with the bus rails by means of the clamps. The contact bars extend to contact with receptors for fuses which are held by screw caps, the receptors including threaded rings fixed to the front of the adapter housing. The front of the adapter housing also has a portion, other than the area having the fuse receptors, for an installation-device mounting bracket used form attachment of installation devices.

The contact bars fixed in the adapter housing establish electrical connection with the bus rails and are used at the same time as contacts for the fuse receptors. The clamps, in addition to establishing electrical connection between the bus rails and the contact bars, at the same time hold the adapter apparatus mechanically to the bus rails. Beyond the fuse receptors there is sufficient room on the front of the adapter housing for a mounting bracket so that the installation devices can be arranged in the immediate vicinity of the bus rails and be connected with the bus rails via the fuses. This requires nothing more than connector leads from the threaded rings to the installation devices.

The following arrangement provides for the attachment of the clamps to the adapter housing and for their adjustability with respect to the contact bars and bus rails. This includes an adapter housing plate which has mounting blocks on its underside facing the bus rails. Such blocks serve to receive screws attaching the contact bars thereto. The clamps are held to the contact rails by means of clamp screws and be adjustable vertically with respect to the bus rails.

Service is simplified by making the clamp screws accessible and adjustable from the front of the adapter housing.

One feature of this invention provides for a clear and secure bracing between the contact bars and the bus rails by having the clamps with the cross-braces and side legs U-shaped with perpendicularly offset jaws at the free ends of the side legs, the clamps engaging the contact bars with the side legs. The cross-braces are arranged alongside the contact bars in a direction facing away from the bus rails, and the side-leg jaws of the clamps engage the rear of the rectangularly cross-sectioned bus rails.

Provision may be made such that the narrow width of the clamp side legs corresponds to the spacing between the contact bars. This allows the clamps to be guided such that they cannot be turned when they are moved vertically with respect to the rails.

Adjustment of the clamps and their permanent support in the adapter housing by having the clamp screws extending adjustably through threaded holes in the cross-braces of the clamps, with the ends of the clamp screws which face the contact bars being freely turnable in, but held securely in, holes in the contact bars.

The orientation of the front of the adapter housing is such that its longer dimension is transverse to the bus rails, with the contact bars angled off and/or having laterally-offset portions which extend into one of the end portions of the longer dimension of the adapter housing with the free ends forming contacts for the receptors for the fuses held by fuse screw caps. The threaded rings of the receptors in this end portion of the adapter housing are beside each other and that the installation-device mounting bracket is connected at the opposite end portion of the front of the adapter housing. The mounting bracket extends along the bus rails over the entire width of the adapter housing. In addition to the fuses and the mounting bracket, there remains sufficient room for adjusting the adjustable clamp screws.

Since there are a variety standardized mounting bracket shapes for different types of installation devices, it is advantageous to have the mounting bracket attached removably to the front of the adapter housing. The adapter apparatus may then easily be adapted for various types of installation devices with corresponding mounting feet. It requires no more than connection of a part of the mounting bracket in question with the adapter housing.

In situations in which the contact bars have threaded receptors for screw-in fuse caps, the receptors can be adjusted to suit specific fuses.

Attachment of the connector leads going to the installation devices is simplified by the threaded rings being fitted with connection lugs for outgoing leads.

The current-conducting parts of the adapter apparatus are shielded from contact by closing the front of the adapter housing, at the end portion with the receptors for fuse screw caps, by a cover which provides access to the threaded rings for the fuse screw caps.

A preferred feature of this invention is the fact that the installation-device mounting bracket is U-shaped in cross-section, with side portions having flanges which extend toward the outside. Such flanges are received in recesses in the mounting foot of the installation devices. This quick-mount for installation devices has proven itself in practice for years and can be used in the same way for mechanical connection of installation devices with the adapter apparatus of this invention as well.

BRIEF DESCRIPTION OF THE DRAWINGS

The invention is explained in greater detail by reference to drawings illustrating an example, in which.

DETAILED DESCRIPTIONS OF PREFERRED EMBODIMENTS

Figure 1:
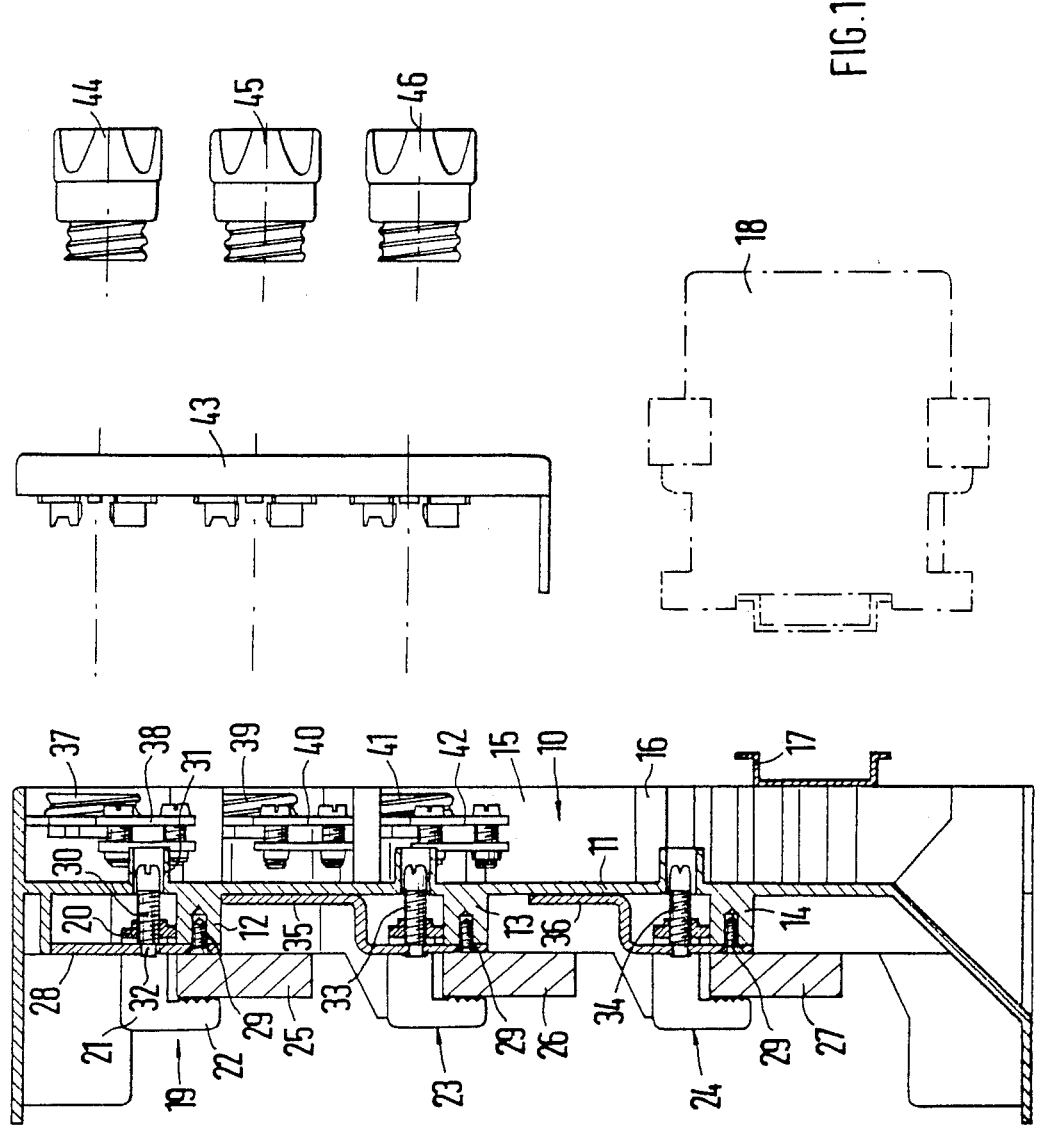
FIG. 1 in sectional view, along the line of I—I in FIG. 2, of an adapter apparatus in accordance with this ivvention connected with the bus rails of a bus bar system and having accessories like a cover, screw caps, and an installation device.

The illustrated embodiment of this invention involves a three-phase bus bar system having three parallel bus rails 25, 26, and 27 spaced apart by a set distance, held in bus rail holders, and held away from a mounting wall in a switch panel or similar device. The adapter apparatus includes an housing 10 which has a dimension transverse to bus rails 25, 26, and 27 and which engages bus rails 25 and 27 from the outside. Adapter housing 10 has a housing plate 11 which includes mounting blocks 12, 13 and 14 along its underside. Three contact bars 28, 35 and 36 are fixed to mounting blocks 12, 13 and 14 by means of screws 29 in such a way that they are accessible from the rear, are facing bus rails 25, 26 and 27, and have portions insulated from each other. Clamp screws 30, 33 and 34, which can be turned freely, are each held in a fixed position against a respective contact bar 28, 35 or 36, as illustrated by the end 32 of clamp screw 30 (see FIG. 1).

Figure 2:
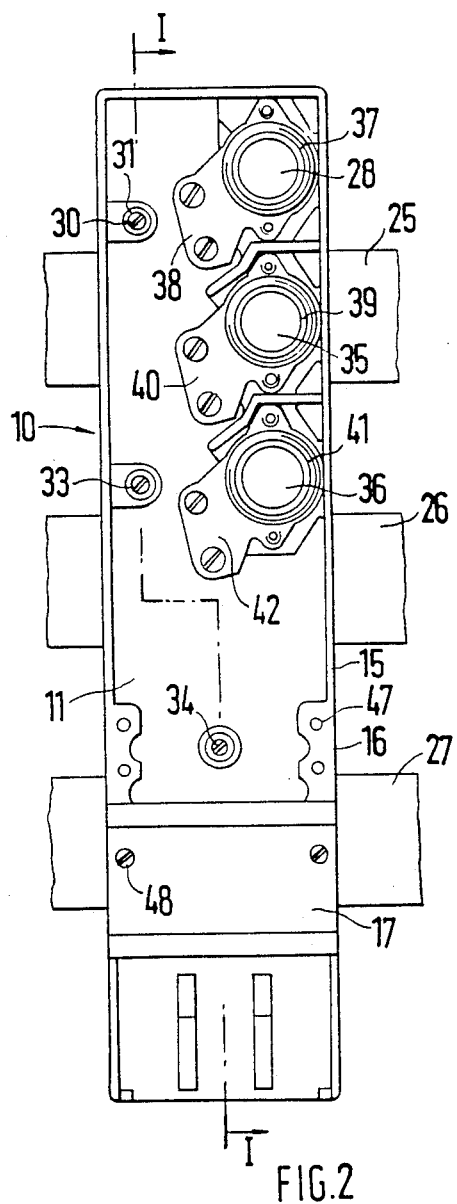
FIG. 2 is a right side elevation of the adapter apparatus of FIG. 1 without cover and screw caps, viewing the device from the front.
Figure 3:
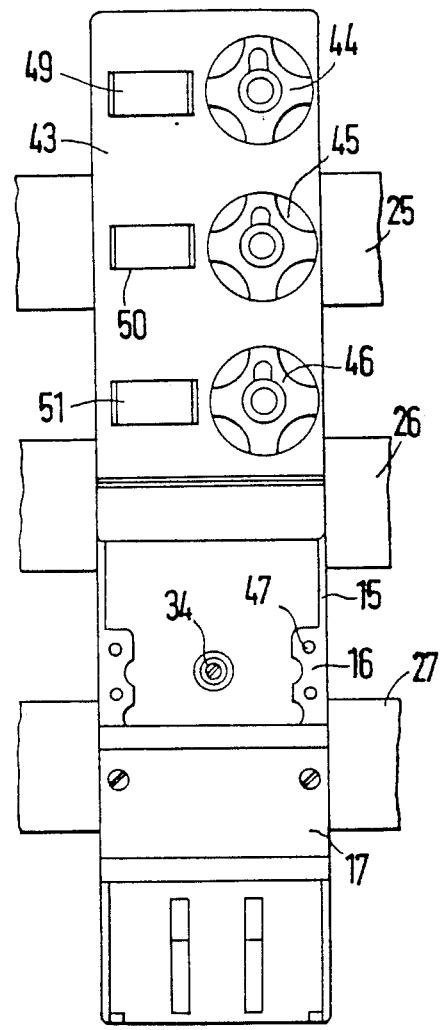
FIG. 3 another front view as in FIG. 2, but complete with cover and screw caps.

Clamp screws 30, 33 and 34 are each extend through a threaded hole in a cross-brace 20 of a U-shaped clamp 19, 23 and 24 and can be adjusted with respect thereto by turning therein. For such adjustment, clamp screws 30, 33 and 34 are accessible from the front of adapter housing 10 as FIG. 2 shows.

The side legs 21 of clamps 19, 23 and 24 engage contact bars 28, 35 and 36, the narrow widths of the side legs corresponding to the spacings between contact bars 28, 35 and 36 in this area. Clamps 19, 23 and 24 are therefore guided vertically with respect to contact bars 28, 35 and 36 and bus rails 25, 26 and 27 during adjustment. At the enss of side legs 21 of clamps 19, 23 and 24, perpendicuaarly offset jaws 22 are formed. Jaws 22 engage the rear sides of rectangularly cross-sectioned bus rails 25, 26 and 27, as shown in FIG. 1. In this case, the rear side of the adapter housing 10 must be shaped in such a way that it accommodates the required lateral shifting after placement of the adapter apparatus on bus rails 25, 26 and 27. As clamp screws 30, 33 and 34 are tightened, contact bars 28, 35 and 36 are mechanically tightened against bus rails 25, 26 and 27 and electrical connections are thereby established with little contact resistance.

Contact bars 28, 35 and 36 are arranged and have laterally-offset portions arranged in the area of threaded rings 37, 39 and 41, which are attached to the front of adapter housing 10. As FIG. 2 illustrates, contact bars 28, 35 and 36 are in this case formed with their end portions as contacts for such receptors, which accommodate fuses. Such fuses are inserted into the screw caps 44, 45 and 46, and the screw caps are screwed into threaded receptor rings 37, 39 and 41. In the illustrated embodiment, threaded rings 37, 39 and 41 are located in the upper end portion of adapter housing 10 along one long side so that enough room remains at the left side for clamp screws 30 and 33. Contact bars 28, 35 and 36 are bent and offset laterally in such a way that they are insulated from each other and from the unassigned bus rails, while at the same time serving as contacts for their respective fuse receptors. In this case, contact bars 28, 35 and 36 may be equipped in their end portions with threaded holes so that available fuse inserts may be screwed in according to the type of fuse to be used. Threaded rings 37, 39 and 41 of the fuse receptors are equipped with connection lugs 38, 40 and 42, by which the ends of insulated connector leads for the installation devices 18 may be connected mechanically and electrically.

In the lower end portion of adapter housing 10 an installation-device mounting bracket 17 is fastened at the front in a direction running parallel to bus rails 25, 26 and 27 and extending over the entire width of adapter housing 10. The walls 15 along the longitudinal sides of the adapter housing 10 have attachments 16 with apertures 47 inwardly of walls 15. Mounting bracket 17 can therefore be connected to adapter housing 10 by means of self-tapping screws 48 screwed into apertures 47.

The upper end portion of adapter housing 10 closed by means of the cover 43, leaving access, however, to the fuse receptors so that screw caps 44, 45 and 46 can still be screwed into threaded rings 37, 39 and 41. The top of the cover 43 has, besides the openings for the screw caps 44, 45 and 46, label spaces 49, 50 and 51 for labels or similar markings. As shown in FIG. 1, installation devices 18 are placed on installation-device mounting bracket 17 such that the mounting flanges of mounting bracket 17 are guided into take-ups in the mounting foot of installation device 18 and are held there. The adapter apparatus can be adapted to all known types of fastening between mounting brackets and installation devices by changing mounting bracket 17. It only requires the appropriate mounting bracket.

Bus rails of various thicknesses and widths are used in bus bar systems. In order to make the adapter apparatus of this invention universally usable, a further refinement provides that the adjusting range of the clamps be adapted to the maximum thickness of the bus rails of the bus bar system, and provides recesses on the rear of the adapter housing in the area of the clamps which correspond in width to the maximum width of the bus rails of the bus bar system plus the width of the jaws of tee clamps.

In the event that the adapter apparatus is to be used for bus bar systems with varying spacing between the bus rails, then an additional provision is made for the clamps to be adjustable with respect to the contact bars and set for different spacings between the bus rails of the bus bar system.

While the principles of this invention have been described in connection with specific embodiments, it should be understood clearly that these descriptions are made only by way of example and are not intended to limit the scope of the invention.

What is claimed:

1. An adapter apparatus for mechanical and electrical connection of installation devices such as automatic circuit breakers, motor protection switches, contactors, relays, and the like with bus rails of a bus bar system which can accommodate installation devices equipped with mounting feet for standard mounting brackets, comprising:
   an adapter housing which may be placed over the bus rails, the housing having a front and a rear;
   at least one contact bar secured to the housing, the contact bar extending to form a receptor contact;
   an adjustable clamp secured to each contact bar and facing a respective bus rail;
   a fuse receptor connected to each contact bars, including a threaded ring at the front of the adapter housing; and
   a mounting bracket on the front of the adapter housing for mounting of installation devices.

2. The adapter apparatus of claim 1 wherein:
   the adapter housing has a housing plate including rear mounting blocks to which the contact bars are attached by screws in positions facing the bus rails; and
   the clamps are secured to the contact bars by clamp screws and are adjustable with respect to the bus rails.

3. The adapter apparatus of claim 2 wherein hhe clamp screws are accessible and can be operated from the front of the adapter housing.

4. The adapter apparatus of claim 2 wherein each clamp is U-shaped, having a cross-brace extending beside the contact bars and facing away from the bus rails, the cross-brace having a threaded hole receiving the clamp screw, and a side leg with a jaw at the free end of the side leg engagable with one of the bus rails at a position behind such bus rail 5. The adapter apparatus of claim 4 wherein adjacent pairs of contact bars are closely spaced with a side leg therebetween, the side leg dimensioned to fit snugly between such contact bars.

6. The adapter apparatus of claim 4 wherein each clamp screw has an end received in a hole in its respective contact bar, such end held in a manner such that it turns freely but is held securely in such contact bar hole.

7. The adapter apparatus of claim 1 wherein:
   the length of the adapter housing ettends across the bus rails;
   the contact bars having laterally off-set portions extending into one end portion of the length of the adapter housing to form the receptor contacts;
   the threaded rings of the receptors arranged beside each other in such end portion of the adapter housing; and
   the mounting bracket connected at the opposite end portion of the adapter housing along the front thereof, said mounting bracket extending over substantially the entire width of the adapter housing to be across all bus bars.

8. The adapter apparatus of claim 1 wherein an installation-device mounting bracket is removably connected to the adapter housing.

9. The adapter apparatus of claim 1 wherein the threaded rings accommodate screw-in fuse caps.

10. The adapter apparatus of claim 9 wherein the threaded rings have connecting lugs for outgoing leads.

11. The adapter apparatus of claim- 7 further comprising a cover over the front of the adapter housing at the end portion with the fuse receptors, the cover leaving access to the threaded rings for the screw-in fuse caps.

12. The adapter apparatus of claim 1 wherein the installation-device mounting bracket is U-shaped in cross-section, having outwardly-extending flanges receivable in a pair of opposed recesses in a mounting foot of an installation device.

13. The adapter apparatus of claim 1 wherein the adjusting range of the clamps is adapted to the maximum thickness of the bus rails of the bus bar system, and the adapter housing has on its rear a recess in the area of the clamps, the width of such recess corresponding to the maximum width of the bus rails of the bus bar system plus the width of the clamp jaws.

14. The adapter apparatus of claim 13 wherein the clamps are adjustable with respect to the contact bars.

* * * * *

UNITED STATES PATENT AND TRADEMARK OFFICE
CERTIFICATE OF CORRECTION

PATENT NO. : 4,832,626                                      Page 1 of 2

DATED : May 23, 1989

INVENTOR(S) : Hans Wagener

It is certified that error appears in the above-identified patent and that said Letters Patent is hereby corrected as shown below:

In Column 1, line 20, change "conncected" to --connected--.

In Column 1, line 52, change "form" to --for--.

In Column 2, line 6, after "and" insert --may--.

In Column 2, line 28, after "housing" insert --is provided--.

In Column 2, line 48, change "there are" to --there is--. In the same line, after "variety" insert --of--.

In Column 3, line 16, change "ivvention" to --invention--.

In Column 3, line 45, delete "are".

In Column 3, line 57, change "enss" to --ends--.

In Column 3, line 58, change "perpendicuaarly" to --perpendicularly--.

In claim 3, line 1, change "hhe" to --the--.

In claim 4, line 7, after "rail" insert --.--.

UNITED STATES PATENT AND TRADEMARK OFFICE
CERTIFICATE OF CORRECTION

PATENT NO. : 4,832,626

DATED : May 23, 1989

INVENTOR(S) : Hans Wagener

It is certified that error appears in the above-identified patent and that said Letters Patent is hereby corrected as shown below:

In claim 7, line 2, change "ettends" to --extends--.

Signed and Sealed this

Sixth Day of February, 1990

Attest:

JEFFREY M. SAMUELS

*Attesting Officer*   *Acting Commissioner of Patents and Trademarks*